May 7, 1957 C. J. MEADOWS 2,791,147
ELECTRONIC MUSIC INSTRUCTION DEVICE
Filed April 28, 1954 3 Sheets-Sheet 1
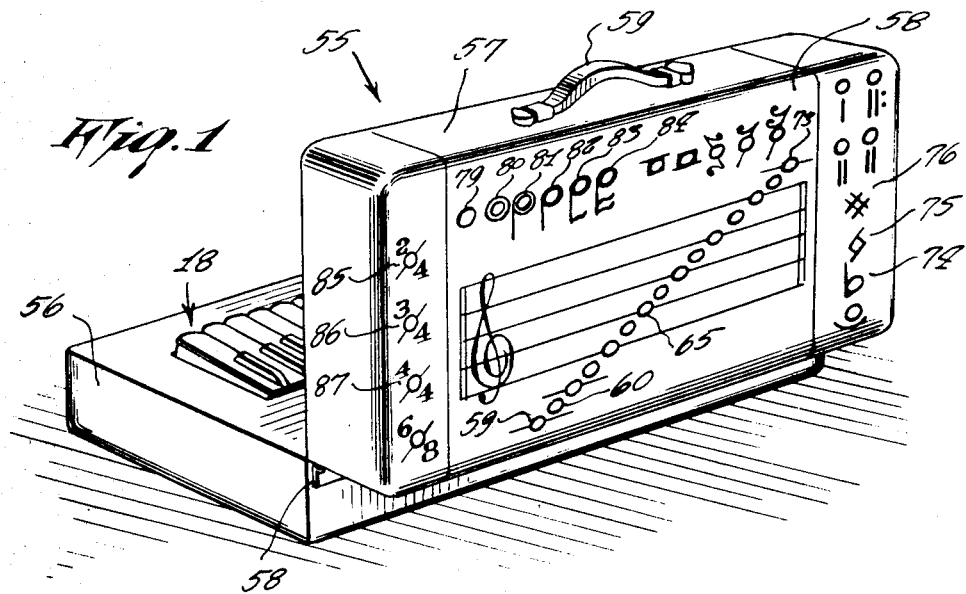
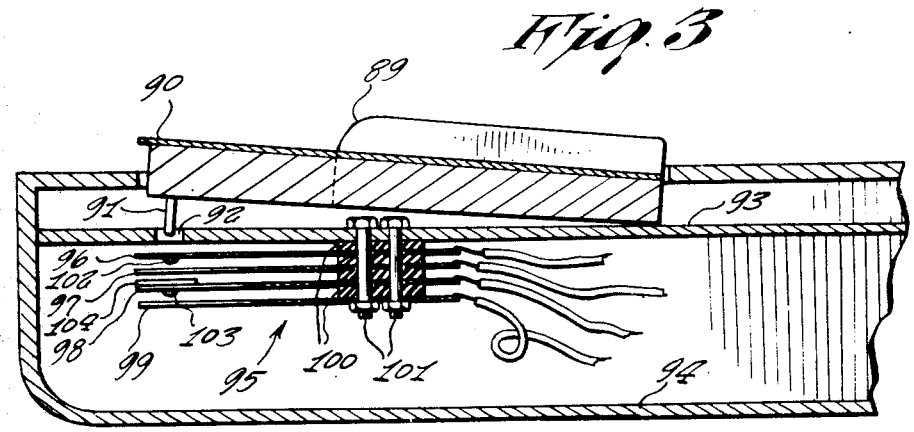
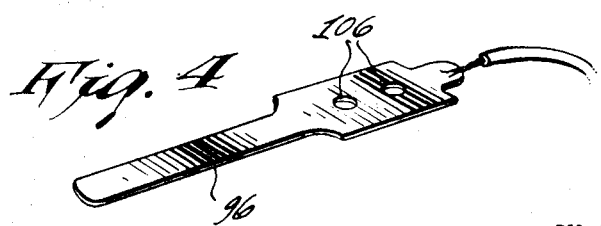
INVENTOR.
BY Clyde J. Meadows

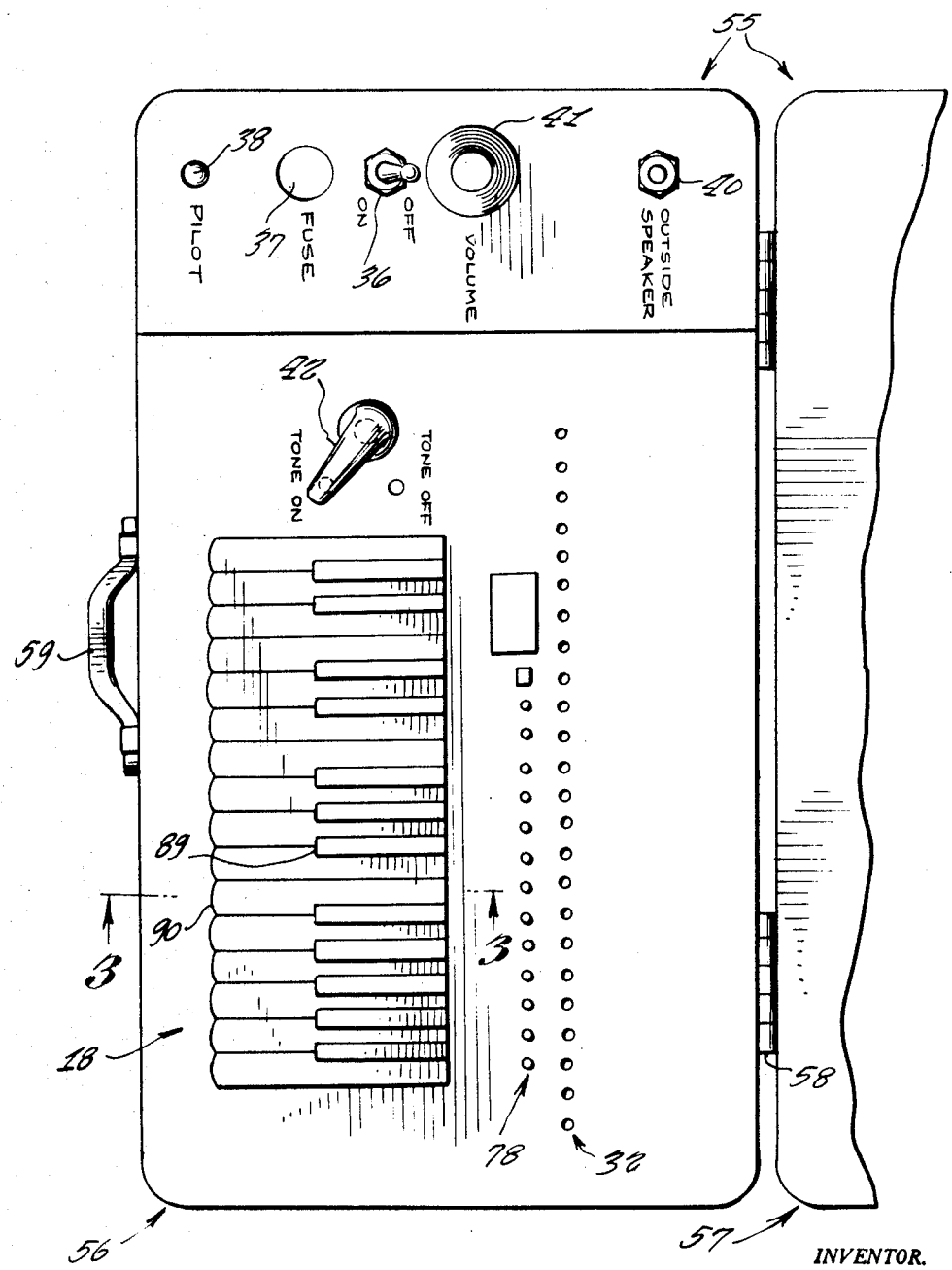

2,791,147
Patented May 7, 1957

2,791,147

ELECTRONIC MUSIC INSTRUCTION DEVICE

Clyde J. Meadows, Austin, Tex., assignor to Syndreco, a corporation of Texas

Application April 28, 1954, Serial No. 426,247

1 Claim. (Cl. 84—470)

The present invention relates to an electronic music teacher.

It is an object of the present invention to enable a student to correlate readily the position of various notes on the staff with the pitch of such notes and with the particular keys of a keyboard which are responsible for causing notes of such pitch to be produced.

It is a further object of the present invention to make it possible to display various musical symbols readily and conveniently to the student in order to give information to the student or to test the student.

A further object of the present invention is to provide an electronic music teacher which is portable and which can, therefore, be brought by a music teacher to the home of a pupil who may not have available an instrument having a keyboard, such as a piano, accordion or the like.

A further object of the present invention is to provide an electronic music teacher in which the musical notes are produced in a very simple and uncomplicated manner whereby the cost of the unit is reduced to a minimum.

Various other objects, advantages and meritorious features of the invention will become more fully apparent from the following specification, appended claim and accompanying drawings, in which:

Figure 1 is a perspective view of the electronic music teacher according to the invention showing a portion of the keyboard thereof and showing the visual information presenting face thereof;

Fig. 2 is a top plan view of the portion of the electronic music teacher shown in Fig. 1 which has thereon the keyboard as well as various controls;

Fig. 3 is a view taken on the lines 3—3 of Fig. 2, and showing the manner in which a particular one of the keys actuates a switch in order to present visual information and in order to simultaneously give a corresponding audible indication;

Fig. 4 is a perspective view of one of the contacts of the switch shown in Fig. 3;

Figure 5:
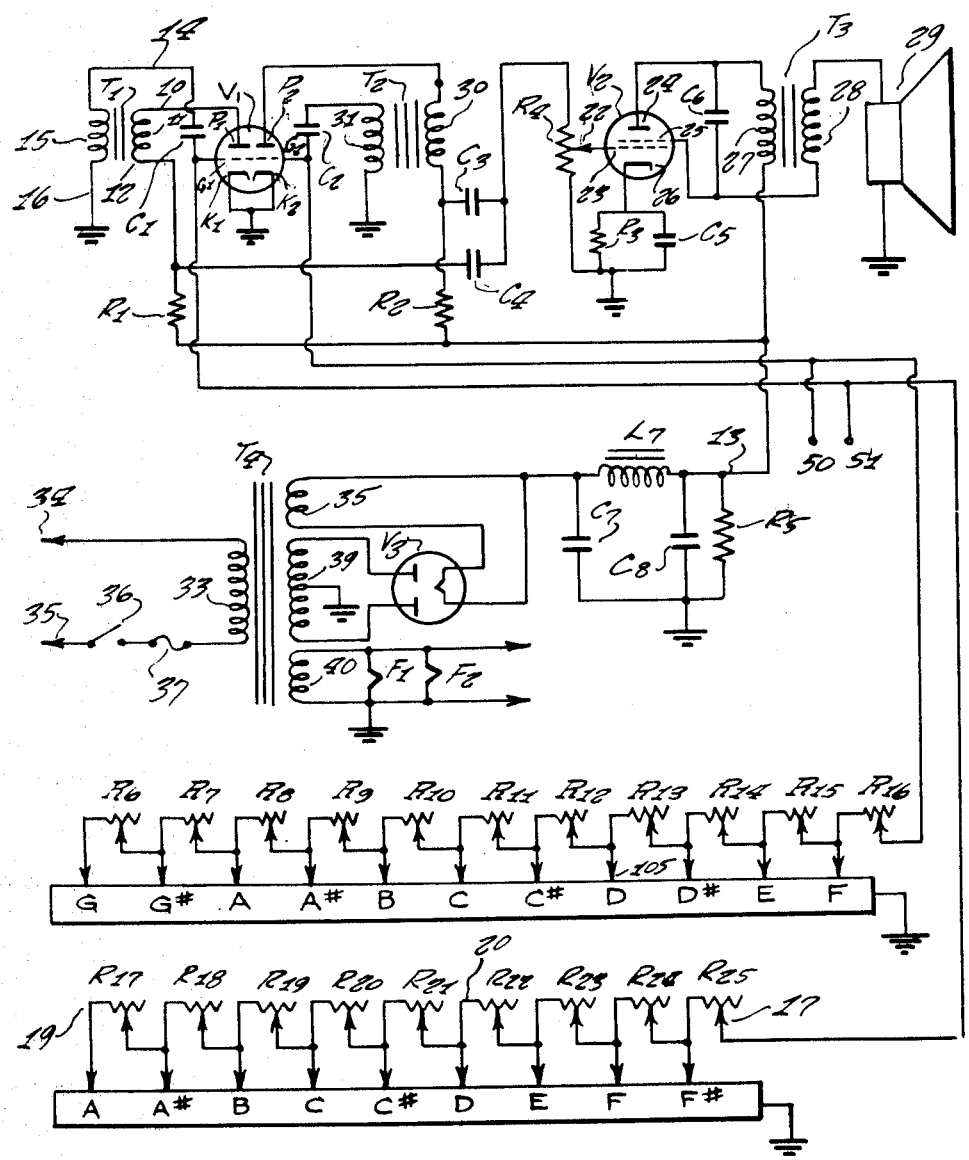
Fig. 5 is a circuit diagram showing the circuits which are responsible for producing the audible indications in response to operation of the keys of the keyboard.

In Fig. 5, V1 represents a dual triode vacuum tube having a plate P1, a grid G1 and a cathode K1. Plate P1 is connected by means of wire 10 to one side of winding 11 of a transformer T1, the other side of said winding 11 being connected by a wire 12 to a source of positive potential, via resistor R1. It will be observed that positive potential is available at .13. Grid G1 of tube V1 is connected to a capacitor C1, the other side of which capacitor is connected by means of wire 14 to one side of winding 15 of transformer T1. The other side of winding 15 is connected to ground by means of a wire 16. Grid G1 can also be connected to ground through any one of the variable resistances R17 through R25 shown near the bottom of Fig. 5. Each of the resistances R17 through R25, and for that matter each of the resistances R6 through R16, is provided with a sliding contact which enables the resistance of the respective resistor to be adjusted to any desired extent. In the case of resistance R25, its slidable contact is identified by the reference numeral 17. One end of each of the resistances R6 through R25 can be grounded at will, by operating the corresponding key of the keyboard 18. It should be understood that the ends of the resistors R6 through R25 are not actually grounded until one of the corresponding keys is actuated. It will be noted further that each of the resistors R17 through R25 is connected to an adjacent resistance by way of its sliding contact. Causing the end 19 of resistor R17 to be grounded, will, therefore, cause grid G1 of tube V1 to be connected to ground through resistors R17 through R25, all in series. Causing the key corresponding to note "D" to operate, will result in the grounding of N20 of resistor 22, thereby grounding grid G1 through resistors R22 through R25, in series. It will be evident that the circuit connected to tube V1 and thus far described is an audio-oscillator circuit. It will also be evident that the frequency produced will depend upon the number of the resistances R17 through R25 placed in series with grid G1 to ground. The output of the audio-oscillator circuit described is taken off at a point between resistor R1 and winding 11 of transformer T1. Such output is applied by way of condenser C4 to a resistor R4 to ground. Resistor R4 is provided with a sliding contact 22 which is connected to grid 23 of an amplifier tube V2. Amplifier tube V2 is provided with a plate 24, a screen grid 25, and a cathode 26. Cathode 26 is connected to one end of a resistor R3 and to one end of a capacitor C5. The other ends of resistor R3 and capacitor C5 are connected to ground. One winding 27 of an output transformer T3 is connected between plate 24 of tube V2 and .13 at which positive potential is available. The other winding 28 of output transformer T3 is connected at one end to screen grid 25 of tube V2 and at the other end to a speaker 29, to ground. The sound emitted by speaker 29 will have the pitch of the desired note.

Tube V1 also has a plate P2, a grid G2, and a cathode K2. The cathode K2 is connected to ground, while plate P2 is connected to one side of winding 30 of a transformer T2, the other side of the winding 30 being connected to .13 by way of resistor R2. The other winding 31 of transformer T2 is connected at one end to ground and at the other end to one side of a condenser C2, the other side of which is connected to grid G2. Grid G2 is connected to ground by way of resistors R6 through R16 which are arranged in the same way that resistors R17 through R25 are arranged. Two audio-oscillators have been provided in order conveniently to secure the desired frequency range. It will be evident that separate tubes could have been used rather than a dual triode tube V1, as illustrated. The output of the second audio-amplifier is taken off between the lower end of winding 30 of transformer T2 and the upper end of resistor R2, by way of a condenser C3, which applies such output to the input resistor R4 of amplifier V2.

Each of the resistors R6 through R25 may be adjusted to the desired extent through holes 32 shown in Fig. 2.

Voltage for the circuits described hereinabove is made available by a circuit which will now be described. In Fig. 5, a power transformer T4 is provided having a primary winding 33 which may be energized from lines 34 and 35 by means of a switch 36. A fuse 37 is provided as a precaution. If desired, a pilot light 38, as shown in Fig. 2, could also be provided. Transformer T4 has secondary windings 38, 39 and 40. Winding 38 supplies filament voltage for rectifier tube V3, while center tapped winding 39 provides plate voltage for the rectifier tube V3. Winding 40 provides filament voltages for the filaments F1 and F2 of tubes V1 and V2. The output of rectifier tube V3 is filtered by a filter network comprising choke L, condenser C7 and condenser C8, arranged in the usual fashion. A bleeder resistor R5 is also provided and the positive voltage for the tubes V1 and V2 is taken from the top point 13 of resistor R5.

Tube V1 may be a 6SN7 tube. Audio-amplifier V2 may be a 6F6 or a 6V6 tube. Tube V3 may be a 5Y3. The feed back transformer T1 may be a small standard interstage type, preferably having a one to one ratio. Capacitor C1 is the coupler from the interstage transformer T1 to the input of grid G1. The size of C1 is not critical since it is used in conjunction with adjustable resistors R17 through R25. Capacitor C5, which is an audio bypass capacitor, should be rather large from 25 to 200 mfd. and with any voltage rating down to 50 volts. Those skilled in the art will recognize that capacitor C6 is an audio shunt which will attenuate frequencies at a point determined by the value of such capacitors C6.

The speaker may be of the permanent magna type and the size thereof may be dependent upon the tone requirements. We have found that a speaker having a six inch diameter is suitable for the present application.

Filter condensers C7 and C8 may be of the order of 16 mfd. and may have voltage ratings of 450 volts each. Bleeder resistor R5 may be of the order of 25,000 ohms and may be of 20 watt rating, for optimum regulation characteristics. If desired, provision may be made for using an additional speaker, and in such case a jack 40, Fig. 2, may be provided adjacent the keyboard. Volume control 41, shown in Fig. 2, is, of course, mechanically connected to sliding contact 22 of resistor R4, shown in Fig. 5. If desired, a switch (not shown) may be connected in series between the point 13 and the lower ends of resistors R1 and R2 in order to turn off the audio-oscillators without turning off the voltage supply or the filament supplies of the audio-oscillators and the amplifier V2. The reference numeral 42, in Fig. 2, shows the control which may be operated to control such switch. This feature would make it possible for the instructor to make available the necessary tones instantly without waiting for the tubes to warm up, as would be the case if switch 36 were turned off and on. Terminals 50 and 51, Fig. 5, may have connected thereto by suitable means, not shown, a further keyboard outside of the electronic music teacher, shown in Fig. 1.

In Fig. 1, reference numeral 55 indicates the electronic music teacher generally which is illustrated as comprising two portions 56 and 57. Portion 56 includes the keyboard 18 and various controls, as shown in Fig. 2. Portion 57 is shown as being hinged to portion 56. Means, not shown, may be provided to maintain the portion 57 in right angle relation to portion 56, or, if desired, the hinge 58 may be of the type which permit portions 56 and 57 to be separated, so that portion 57 may be placed at any convenient location remote from portion 56. In either case, electrical connections will be required between portion 56 and 57 and such connections have not been shown since they are presumed to be within the skill of the art. Where portion 56 is separable from portion 57, the electrical connections may obviously take the form of a cable having suitable plugs at the ends thereof adapted to interfit with sockets with which portions 56 and 57 may be provided.

A handle 59 may be provided on portion 57 for carrying the unit 55. Portion 57 has a face 58 which is provided with a staff including a G clef sign. Lights 59 and 60, 65 up to 73 are provided in positions corresponding to those which notes might occupy in relation to the staff. Each of the lights 59 through 73 will light when the corresponding key on the keyboard is depressed. Since, as has been explained before, actuation of a particular key will cause the loud speaker 29 to emit a sound of the proper pitch, it will now be seen that in addition to such audible indication, there will be provided a visual indication showing the precise location of the note in question with respect to the staff. The face 58 of portion 57 of unit 55 is also provided with various symbols, such, for instance, as flat 74, neutral 75 and sharp 76. Each of these symbols which have been mentioned and each of the other symbols, signs, etc. which are shown is provided with an electric light which can be operated by the instructor. A row of switch buttons 78, shown in Fig. 2, is provided for causing the lights of the various symbols, signs, etc. other than the notes to emit light. Needless to say, suitable identifying indicia, not shown, is associated with each of the push buttons shown in row 78 of Fig. 2, to enable the instructor to locate the push button corresponding to the particular symbol, sign, etc. which he may desire to illuminate. Reference numerals 79 through 84 identify a row of six lights, each of which is centered in a note of different definition. These lights too are under control of push buttons in row 78. Lights 79 through 84 permit the instructor to indicate to the student just how long the student should hold a particular note. Reference numerals 85, 86, 87 and 88 are to identify further lights on surface 58 of portion 57, each of these lights indicating a fraction which, musically speaking, indicates the "time." By causing any particular one of the numerical fractions 85 through 88 to become illuminated, the student can be informed the particular "time" which is to be played.

In Fig. 3, reference numeral 89 indicates a black key while reference numeral 90 indicates a white key. Each of the various keys of the keyboard 18 are pivoted in any suitable way, not shown. Key 90 is provided with a downwardly extending member 91 which registers with and is adapted to pass through an opening 92 provided in a wall 93 which is located below the keys. In a compartment formed between walls 93 and 94, the latter being the bottom wall of portion 56 of unit 55, switches are provided, one for each of the various keys. The switch associated with key 90 is identified generally by the reference numeral 95. Switch 95 comprises a number of flexible blades 96, 97, 98 and 99. Blocks 100 of insulating material separate each of the flexible blades 96 to 99 from each other and from the wall 93. Bolts 101 are provided for mounting the blades 96 through 99 and the insulating blocks 100 on wall 93 in the position shown. Blade 96 is provided with a contact protuberance 102 which is adapted to contact the adjacent portion of blade 97 when blade 96 is forced downwardly by member 91 depending from key 90. Blade 98 is provided with a contact protuberance 103 which is adapted to contact the adjacent portion of blade 99 when blade 98 is caused to move downwardly by reason of the descent of member 91 through opening 92. A block of insulating material, block 104, is provided at the end of the upper surface of blade 98 in order to insulate blade 98 from blade 97, when blade 97 is moved downwardly upon operation of key 90.

In Fig. 4, there is shown a perspective view of blade 96. Blades 97, 98 and 99 are of similar construction. It will be seen that when key 90 is caused to descend, a circuit will be completed through blades 96 and 97 and a separate further circuit will be completed through blades 98 and 99, the arrangement being such that descent of member 91 will move blade 96 downwardly, blade 96 will contact blade 97, blade 97 will contact insulating block 104 causing blade 98 to descend into a position in which contacting protuberance 103 engages blade 99.

Blades 96 and 97, when closed, may complete a circuit which is responsible for illuminating a particular one of the lights 59 through 73 on circuits 58 of the upright portion 57 of the electronic music teacher. Blades 98 and 99 may complete a circuit to ground for a particular one of resistors R6 through R25 in Fig. 5. The upper blade 98 of the two blades 98 and 99 in Fig. 3 may correspond to arrow 105 shown in Fig. 5, while the lower blade 99 may correspond to the grounded strip in Fig. 5 which is engaged by the arrows such as 105, said strip having marked thereon characters corresponding to the respective keys.

The various blades such as 96 may be made of spring steel or of flexible brass. Each of these blades is provided with holes 106 to receive the mounting bolts 101. It will be seen from the foregoing description that there has been provided an electronic music teacher which may be portable and which is capable of presenting simultaneously or separately, as desired, visible or audible indications corresponding to the keys of a keyboard of a musical instrument such as a piano, accordion or organ. It should be expressly understood that the foregoing description is not intended to be limiting and that while the complete unit 55 has been described as having an exposed surface 58 displaying various musical signs, symbols, notes, etc., a removable cover could be readily provided for protecting surface 58 when the unit 55 is being transported. Other departures may be made from the specific preferred embodiment described, while still remaining within the invention as defined in the accompanying claim.

What is claimed is:

In a self-contained electronic music instruction device, the combination of a portable carrying case comprising upper and lower sections connected together, the upper section of said case affording a panel having a musical staff thereon, a set of note indicating lamps provided on said panel in predetermined positions corresponding to to the positions of successive notes in a musical scale on said staff, a keyboard provided on the lower section of said case and including a set of depressibly mounted keys, a set of normally open switches mounted in the lower section of the case under the recomprising upper and lower pairs of elongated contact members secured at one end thereof in spaced superposed spective keys of said keyboard, each of said switches relation, insulating means provided between the upper and lower pairs of said members, the contact members in each pair having resiliently bendable free end portions electrically engageable with each other, and actuating pins secured to and projecting downwardly from the keys of said keyboard, said pins being engageable with the uppermost contact members of the respective switches, whereby both pairs of contact members of the switches may be electrically engaged by depression of the respective keys, the note indicating lamps being in circuit with one pair of contact members of the respective switches, and an electronic tone producing means provided in said case, said tone producing means being in circuit with the other pair of contact members of the respective switches and adapted to produce varying tones in accordance with the respective keys of said keyboard and corresponding in pitch to the notes on said staff, whereby the various note indicating lamps may be energized and corresponding tones simultaneously sounded by actuation of the respective keys of said keyboard.

References Cited in the file of this patent

UNITED STATES PATENTS

| 2,048,610 | Kock | July 21, 1936 |
| 2,505,608 | Edwards | Apr. 25, 1950 |
| 2,547,535 | Pierce et al. | Apr. 3, 1951 |
| 2,632,065 | Smith et al. | Mar. 17, 1953 |

FOREIGN PATENTS

| 1,026,845 | France | May 5, 1953 |